3,337,615
PREPARATION OF ORGANIC SULFONIC
COMPOUNDS
William J. Roberts, Bernardsville, Charles L. Smart, Millington, and Joseph Di Pietro, New Providence, N.J., assignors to Celanese Corporation, a corporation of Delaware
No Drawing. Filed Jan. 30, 1964, Ser. No. 341,440
11 Claims. (Cl. 260—513)

This invention relates broadly to the preparation of organic compounds and, more particularly, organic sulfonic compounds. It is especially concerned with a new and unobvious method of adding an alkanesulfonic acid or a derivative such, for example, as a salt or ester thereof to a monomeric olefin to form a compound having a sulfonic acid group, or, for instance, a corresponding salt or ester group, and which is free (substantially free) from any residual, reactive double bonds.

Still more particularly, organic sulfonic compounds (hereafter for brevity sometimes collectively designated as organic sulfonates) are prepared in accordance with the present invention by bringing into reactive relationship (1) an alkanesulfonic compound, more particularly at least one member of the group consisting of alkanesulfonic acids and their derivatives such as salts and esters of alkanesulfonic acids, and (2) at least one monomeric olefin, preferably a monomeric alpha-olefin, in the presence of a catalytic amount of a free-radical initiator, e.g., an organic peroxide. The reaction is preferably carried out under heat and while the aforesaid ingredients are contained in a liquid reaction medium, e.g., an inert, volatile (volatilizable), saturated, aliphatic hydrocarbon which is liquid under the reaction conditions.

Taking an alpha-olefin as illustrative of the monomeric olefinic reactant and methanesulfonic acid as illustrative of the sulfonating agent, the organic sulfonic acid produced therefrom may be represented by the general formula (I)        R—(CH$_2$)$_n$—CH$_2$SO$_3$H wherein R represents a substituted or unsubstituted hydrocarbon radical and $n$ represents an integer which is at least 1. This reaction may be illustrated by the following simplified equation:

(II)
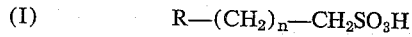
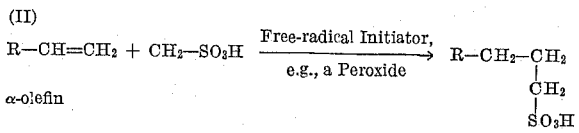

The sulfonation of unsaturated organic compounds using various sulfonating agents is broadly old in the art. However, to the best of our knowledge and belief it was not known prior to the present invention that alkanesulfonic acids, or derivatives such as salts and esters thereof, could be added to olefins (especially alpha-olefins) with the air of a free-radical initiator such as a peroxide to produce organic sulfonic compounds of high purity and in good yield.

THE OLEFINIC REACTANT

Although not limited thereto, the olefinic reactant is preferably an ethylenically-unsaturated hydrocarbon, e.g., ethylene, propylene, butene-1, butene-2, the higher alkene-1's including pentene-1 through octadecene-1 and higher such as those containing about 30 carbon atoms, the higher alkene-2's corresponding in number of carbon atoms to the aforementioned alkene-1's, styrene, methylstyrenes, alpha-methylstyrene, isopropenyltoluene, butadiene, vinylnaphthalene, vinylcyclohexanes, allylbenzenes, methallylbenzenes and other ethylenically-unsaturated hydrocarbons including both straight-chain and cyclic types or kinds. Other and more specific examples include 3-methylbutene-1, 4-methylpentene-1, 5-methylhexene-1, 6-methylheptene-1 and alpha - methyl - p - methylstyrene. Still other examples include the various acrylic compounds, both substituted and unsubstituted, including, for example, the acrylic and alpha-substituted acrylic acids, esters, nitriles and amides. Among such acrylic compounds may be specifically mentioned acrylic and methacrylic acids, acrylamide and methacrylamide, acrylonitrile and methacrylonitrile, and such esters of acrylic and methacrylic acids as the methyl through octadecyl esters of said acids.

Although the olefinic reactant may be one that has terminal and/or internal unsaturation, the preferred olefin is one that has terminal unsaturation (i.e., a vinyl end group) and, more particularly, an alpha-olefin (alkene-1) having at least 7 carbon atoms in an aliphatic chain. Mixtures of different olefins may be used as desired or as may be required in order to produce a mixture of organic sulfonic compounds having properties best adapted for use in a particular service application. The olefin may be a commercial grade of material and may contain a small amount of non-olefinic material such as saturated hydrocarbons having a boiling point close to that of the olefinic reactant.

THE SULFONATING AGENT

The sulfonating agent or reactant is an alkanesulfonic acid or a derivative such, for example, as a salt or ester thereof, and more particularly those alkanesulfonic acids represented by the general formula R'—SO$_3$H wherein R' represents an alkyl radical containing, for instance, from 1 to about 6 carbon atoms. In some cases it may be desirable to use a salt or an ester of the alkanesulfonic acid instead of the acid itself or a mixture of the acid and salt and/or ester in any proportions.

Examples of salts of alkanesulfonic acids are those represented by the general formula (R''—SO$_3$)$_n$—Me wherein R'' has the same meaning as R' in the formula R'SO$_3$H, Me represents a monovalent or polyvalent, inorganic, salt-forming cation, and $n$ represents an integer which corresponds to the valence of Me. Thus, Me may represent such cations as, for example, sodium, potassium or other alkali metal, calcium, strontium, barium or magnesium.

Examples of esters of alkanesulfonic acids are those represented by the general formula R'''—SO$_3$R'''' wherein R''' has the same meaning as R' in the formula R'SO$_3$H and R'''' represents a radical including a hydrocarbon radical derived from an ester-forming compound such as a monohydric or polyhydric compound, e.g., a monohydric or polyhydric alcohol. Examples of such alcohols are the C$_1$ through C$_{10}$ monohydric alcohols and higher members of the homologous series.

THE FREE-RADICAL INITIATOR

Although not limited thereto, the free-radical initiator is advantageously a peroxide and, more particularly, an organic peroxide such as a dialkyl peroxide. Thus, the initiator may be one represented by the general formula (III)
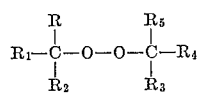

wherein the various R's, which may be the same or different but which are preferably symmetrical, represent a member of the group consisting of hydrogen and alkyl (including cycloalkyl), aralkyl, aryl and alkaryl radicals. Illustrative examples of radicals represented by the various R's are methyl, ethyl and propyl through octadecyl (both normal and isomeric forms), cyclopentyl, cyclohexyl, cycloheptyl, benzyl, phenylethyl, phenylpropyl, phenyl, tolyl, xylyl and others that will be apparent to those skilled in the art from the foregoing illustrative examples. Specific examples of peroxides embraced by the above formula also will be apparent to those skilled in the art from the aforementioned specific examples of substituents represented by the various R's.

More specific examples of free-radical initiators are di-t.-butyl peroxide, di-t.-amyl peroxide and other dialkyl peroxides; the symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; unsymmetrical or mixed diacyl peroxides, e.g., acetyl benzoyl peroxide, propionyl benzoyl peroxide, etc.; the organic per-salts, e.g., t.-butyl perbenzoate, t.-amyl perbenzoate, etc.; the inorganic per-salts, eg., the sodium, potassium and other alkali-metal and the ammonium per-salts such as the persulfates, perborates and perphosphates; and others known in the art (e.g., U.S. Patent No. 2,818,362, col. 5, line 68, through line 38, col. 6).

CONDITIONS OF REACTION

*Proportions of reactants.*—The monomeric olefin is reacted with the alkanesulfonic compound using a molar excess (e.g., from about 3.0 moles to about 150 or more moles, preferably from about 10 to about 100 moles, in excess) of the latter over stoichiometrical proportions.

A catalytic amount of free-radical initiator is employed. although this amount will vary considerably, the free-radical initiator ordinarily is present in the reaction mass in from about 0.01 to about 0.5 mole percent of the molar amount of monomeric olefin. The use of a higher molar amount of free-radical initiator is not precluded. For economic reasons, obviously no more initiator should be employed than the minimum required to produce the desired results.

*Temperature of reaction.*—The reaction is usually carried out under heat, e.g., at a temperature ranging between about 50° C. to about 250° C. or even 400° C., depending, for instance, upon the particular monomeric olefin, alkanesulfonic compound and initiator employed, the particular mode of operation (i.e., continuously, semicontinuously or batch), type of equipment used, and other influencing factors. The free-radical initiator is especially important in connection with the temperature of reaction since the different initiators decompose at different temperatures. In batch-type operations the reaction is usually carried out under reflux at the boiling temperature of the reaction mass.

*Pressure of reaction.*—The reaction may be carried out at atmospheric, superatmospheric or subatmospheric pressure or by any combinations thereof. In selecting a reaction pressure one takes into consideration, of course, the vapor pressure of the particular olefinic reactant, the type of equipment employed and other conditions of reaction. Thus, when the monomeric olefin is one which is normally a gas at atmospheric pressure, the reaction is carried out at superatmospheric pressure; for example, the reaction may be carried out in a liquid reaction medium in which the olefin is at least partly soluble and maintaining an atmospheric olefin under superatmospheric pressure over the surface of the liquid in which part of the olefin has dissolved.

*Time of reaction.*—In general, the time of reaction will vary with the particular reactants employed and the temperature of the reaction, as well as with the mode of operation. Thus, in batch operations under reflux it may range, for example, from ½ to 6 days or more. The time may be shortened by carrying out the reaction at a higher temperature or both at a higher temperature and under superatmospheric pressure. Of course, one should then use a free-radical initiator which decomposes at the higher temperature employed.

*Reaction medium.*—As indicated hereinbefore, the reaction is preferably carried out while the primary reactants and the free-radical initiator are contained in a liquid reaction medium, more particularly an inert (substantially completely inert) liquid reaction medium. By "inert" or "substantially completely inert" is meant a reaction medium, solvent or diluent which is so inert under the reaction conditions that it will not adversely affect the course of the reaction or the reaction products. By "liquid" is meant a reaction medium which is liquid at the reaction temperatuure. In other words, the reaction medium may or may not be liquid at normal or ambient temperature so long as it is liquid or in liquid state at the reaction temperature. Preferably the liquid reaction medium is one which is volatile without decomposition.

Any reaction media meeting the above requirements are satisfactory for use. More specific examples of such reaction media are the alkanes, e.g., n-hexane, n-heptane, n-octane, isooctane, n-nonane, n-decane and higher members of the homologous series.

When the reaction is effected in an inert liquid reaction medium, the concentration of the primary reactants (monomeric olefin plus alkanesulfonic compound) in the said medium may be varied considerably, but ordinarily they constitute, by weight, from about 10% to about 50% of the total reaction mass (i.e., primary reactants, free-radical initiator and inert liquid reaction medium).

It is not essential to carry out the reaction in an inert liquid reaction medium. For example, an excess of the alkane sulfonic reactant such as, for instance, methanesulfonic through heptanesulfonic acid may constitute the reaction medium. Similarly, an excess of salts or esters of alkanesulfonic acids that are in liquid state at the reaction temperature may function as the reaction medium.

It is not essential that all of the free-radical initiator be added initially to the reaction mixture along with the other ingredients. Thus, better results are sometimes obtained when the initiator is added gradually during the course of the reaction, for instance while heating under reflux conditions. The initiator may be added in increments while heating under reflux, or a solution of the initiator may be pumped slowly into the reaction zone throughout the reaction period.

The organic sulfonic compounds produced by the method of this invention may sometimes be used in cleansing and other formulations without isolation in any way other than, if desired, to concentrate them by evaporation of the liquid solvent. Or, if desired, they may be isolated or purified, for example by extraction techniques with various organic solvents, by fractional distillation, and other known product-isolation means, or by any repetitions or combinations thereof.

From the foregoing description it will be seen that the organic sulfonic compounds resulting from the method of this invention include those embraced by the following general formula when using a terminal olefin and an alkanesulfonic acid as starting reactants:

(IV) 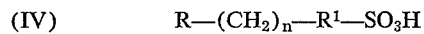

wherein R and $n$ have the same meanings as in Formula I and $R^1$ represents an alkylene radical which is derived from the alkanesulfonic acid starting reactant; and by the following broader general formula when using an internal and/or a terminal olefin as a starting reactant:

(V) $\quad\quad\quad\quad Z-R^1-SO_3H$ wherein $R^1$ has the same meaning as in Formula IV and Z represents the residue of the starting olefinic reactant. The corresponding salts and esters will be apparent to those skilled in the art from the foregoing formulas for the sulfonic acids.

The organic sulfonic compounds produced in accordance with this invention are useful as chemical intermediates, as detergents in cleansing and other compositions, as components of textile-treating compositions, as modifiers of plastic and other resinous compositions, as components of antistatic compositions, and for many other purposes that will be apparent to those skilled in the art.

In order that those skilled in the art may better understand how the present invention can be carried into effect, the following examples are given by way of illustration and not by way of limitation. All parts are by weight.

*Example 1*

To a boiling mixture of 40 parts of n-heptane, 20 parts of methanesulfonic acid and 0.4 part of di-t.-butyl peroxide, contained in a reaction vessel provided with a reflux condenser, is added over a period of 4 hours a solution of 20 parts of n-heptane containing 5 parts of dodecene-1 and 10 parts of methane-sulfonic acid. The resulting mixture is heated for 72 hours within the temperature range of 100°–110° C. At the end of the reaction period the reaction product is stripped of the excess n-heptane by simple distillation, and the remainder is fractionally distilled to yield 52% of dark-colored sulfonated hydrocarbon. Analysis establishes that it contains S, O, C and H elements. It possesses a sulfur-to-oxygen ratio of 1 to 3.

Instead of methanesulfonic acid in the above example one may substitute an equivalent molar amount of other available alkanesulfonic acids including, for example, ethane-through hexanesulfonic acids, or mixtures thereof in any proportions.

*Example 2*

Example 1 is repeated but substituting, in individual runs, an equivalent molar amount of the following free-radical initiators in place of 0.4 part of di-t.-butyl peroxide:

(a) Di-t.-amyl peroxide
(b) Di-t.-butyl perbenzoate
(c) Diacetyl peroxide
(d) Dibenzoyl peroxide Varying yields of sulfonated hydrocarbon are obtained in each case.

*Example 3*

Essentially the same procedure is followed as described under Example 1 with the exception that, instead of dodecene-1, there is used in individual runs the same amount of the following olefins:

(a) Decene-1
(b) A mixture of $C_{11}-C_{15}$ alpha-olefinic hydrocarbons (mainly straight-chain)

In each case a good yield of sulfonated hydrocarbon is obtained.

*Example 4*

Same as in Examples 1 and 3 with the exception that, instead of methanesulfonic acid, there is used in individual runs an equivalent molar amount of the sodium salt of methane-sulfonic acid. In each run a good yield of the sodium salt of sulfonated hydrocarbon (of varying chain length depending upon the olefinic starting reactant employed) is obtained.

Instead of the sodium salt of methanesulfonic acid one may substitute other alkali-metal or other salts of methanesulfonic acid, or any of the alkali-metal or other salts of the higher alkanesulfonic acids such as, for example, methane- through pentane-sulfonic acids.

*Example 5*

Same as in Examples 1 and 3 with the exception that, instead of methanesulfonic acid, there is used in individual runs an equivalent molar amount of the methyl ester of methanesulfonic acid. In each case there is obtained a good yield of methyl ester of sulfonated hydrocarbon, the chain length of which varies with the chain length of the starting olefinic reactant.

Instead of the methyl ester of methanesulfonic acid one may substitute the ethyl, propyl, butyl or higher alkyl or other hydrocarbyl esters of methanesulfonic acid, or the methyl through amyl or higher alkyl or other hydrocarbyl esters of ethanesulfonic acid, propanesulfonic acid, butanesulfonic acid or of other higher alkanesulfonic acids.

It will be understood, of course, by those skilled in the art that the present invention is not limited to the specific ingredients, proportions thereof, time, temperature and other conditions of reaction given in the foregoing examples by way of illustration. Thus, instead of the particular reactants, free-radical initiators and inert solvent employed in individual examples one may use any of such materials mentioned in the portion of this specification prior to the examples; and they may be employed in the ranges of proportions and under the conditions of reaction broadly and more specifically there set forth.

The embodiments of the invention in which an exclusive property or privilege is claimed are defined as follows:

1. The method of preparing an organic sulfonic compound which comprises reacting at a temperature of about 50° C. to 400° C. (1) a molar excess of at least one member of the group consisting of alkanesulfonic acids containing 1 to 6 carbon atoms, salts of said acids wherein the cation is inorganic and monovalent and esters of said acids and monohydric alcohols containing 1 to 10 carbon atoms, and (2) at least one monomeric olefin containing 2 to 30 carbon atoms in the presence of a catalytic amount of a free-radical initiator.

2. A method as in claim 1 wherein the reactant of (1) comprises an alkanesulfonic acid.

3. A method as in claim 2 wherein the alkanesulfonic acid is methanesulfonic acid.

4. A method as in claim 1 wherein the monomeric olefin comprises a monomeric alpha-olefin.

5. A method as in claim 4 wherein the monomeric alpha-olefin comprises one having at least 7 carbon atoms in an aliphatic chain.

6. A method as in claim 1 wherein the free-radical initiator comprises an organic peroxide.

7. A method as in claim 6 wherein the organic peroxide comprises a peroxide represented by the general formula

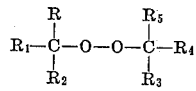

wherein the various R's represent a member of the group consisting of hydrogen and alkyl, aralkyl, aryl and alkaryl radicals.

8. A method as in claim 7 wherein the peroxide within the scope of the defined general formula is a dialkyl peroxide.

9. The method of preparing an organic sulfonic compound which comprises reacting together at a temperature of about 50° C. to 400° C. (1) a molar excess of at least one member of the group consisting of alkanesulfonic acids containing 1 to 6 carbon atoms, salts of said acids wherein the cation is inorganic and monovalent and esters of said acids and monohydric alcohols containing 1 to 10 carbon atoms, and (2) at least one monomeric alpha-olefin containing 2 to 30 carbon atoms, said reaction being effected in the presence of a catalytic amount of a free-radical initiator comprising an organic peroxide and while the aforesaid ingredients are contained in a liquid reaction medium.

10. A method as in claim 9 wherein the liquid reaction medium is an inert, volatile, saturated, aliphatic hydrocarbon which is liquid under reaction conditions.

11. A method as in claim 9 wherein the monomeric alpha-olefin comprises one having at least 7 carbon atoms in an aliphatic chain.

References Cited

FOREIGN PATENTS 411,773   6/1934   Great Britain.

LORRAINE A. WEINBERGER, *Primary Examiner.*

MARY B. WEBSTER, *Assistant Examiner.*